Dec. 4, 1956  A. J. MATTER  2,772,442
SHELL FISH PROCESSING MACHINE
Filed Oct. 8, 1952  8 Sheets-Sheet 1

INVENTOR.
Albert J. Matter

Dec. 4, 1956  A. J. MATTER  2,772,442
SHELL FISH PROCESSING MACHINE
Filed Oct. 8, 1952  8 Sheets-Sheet 2

INVENTOR.
Albert J. Matter

Dec. 4, 1956  A. J. MATTER  2,772,442
SHELL FISH PROCESSING MACHINE
Filed Oct. 8, 1952  8 Sheets-Sheet 4

INVENTOR.
Albert J. Matter

Dec. 4, 1956  A. J. MATTER  2,772,442
SHELL FISH PROCESSING MACHINE
Filed Oct. 8, 1952  8 Sheets-Sheet 5

INVENTOR.
Albert J. Matter

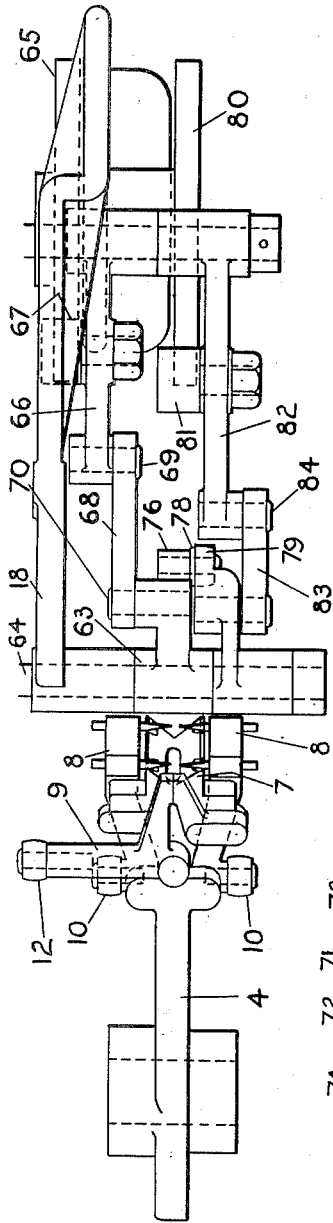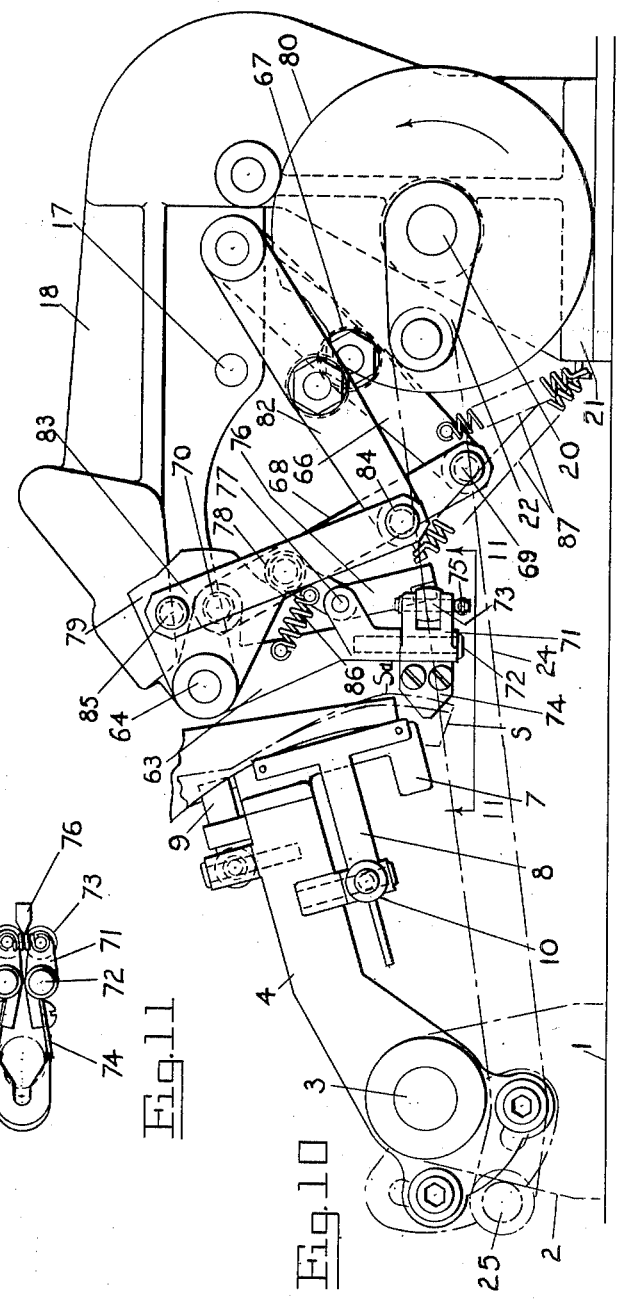

Dec. 4, 1956  A. J. MATTER  2,772,442
SHELL FISH PROCESSING MACHINE
Filed Oct. 8, 1952  8 Sheets-Sheet 7

INVENTOR.
Albert J. Matter

INVENTOR.
Albert J. Matter

United States Patent Office 2,772,442
Patented Dec. 4, 1956

2,772,442
SHELL FISH PROCESSING MACHINE
Albert J. Matter, Park Ridge, Ill.
Application October 8, 1952, Serial No. 313,756
6 Claims. (Cl. 17—2)

This invention relates to improvements in shell fish processing and machine therefor and has for its object to provide a machine for holding shrimp and similar shell fish and consecutively slitting the back of the shell, removing the vein and removing the body from the shell and tail.

Another object is to provide a machine of this type wherein two holders are arranged to oscillate side by side alternately so that one holder is in loading position while the other is passing through the processing stages.

Another object is to provide a continuously loadable machine for the purpose without the necessity of a large number of holders such as would be required in a conveyor or rotary table type, so as to reduce the cost of holders and grippers and their maintenance.

Another object is to provide a small, compact machine of this type, easy to service and keep sanitary.

I attain these objects by means of mechanism shown in the accompanying drawing in which:

Fig. 9 shows a plan view of one holder, one remover and operating mechanism, including crank and cams.

Fig. 10 is an elevation of the parts shown in Fig. 9.

Fig. 11 is a bottom view of the parts shown at 11—11 in Fig. 10.

Like numerals of reference indicate similar parts throughout the several views.

Figure 1:
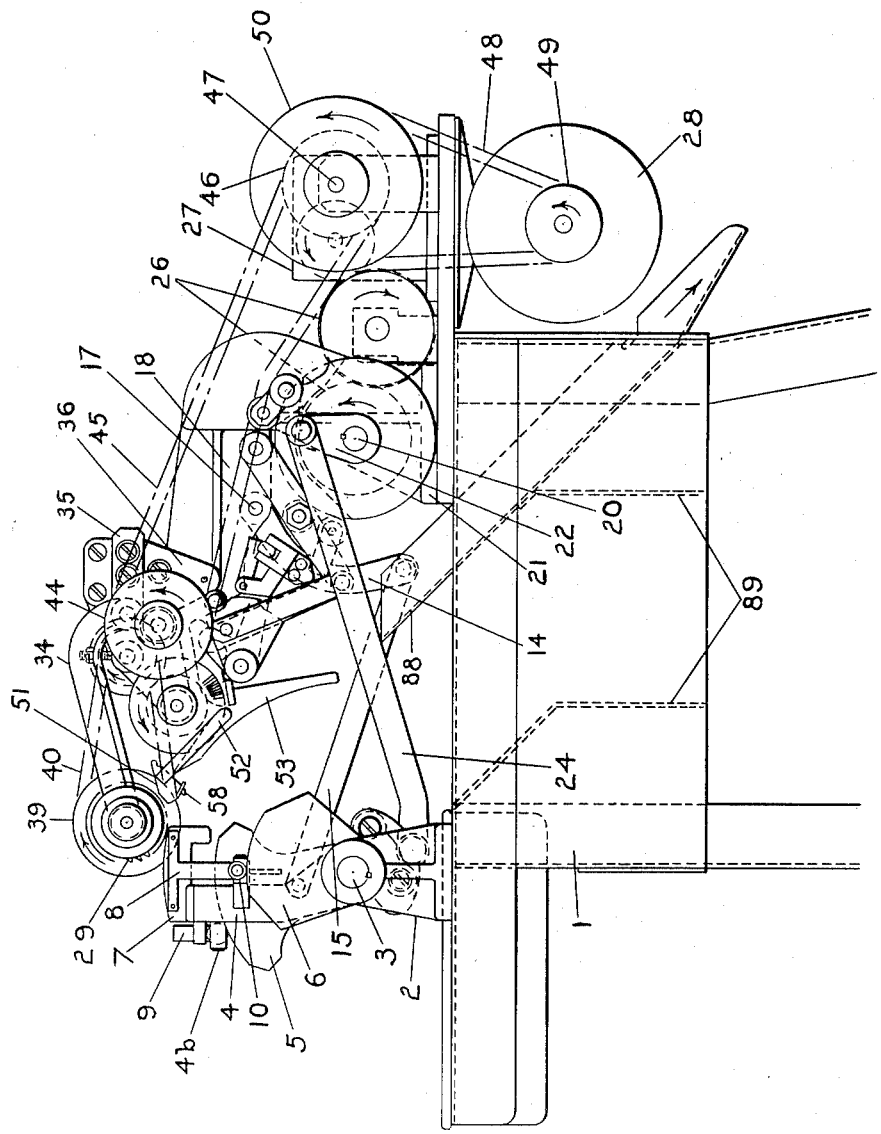
Fig. 1 shows a side elevation of the machine mechanism.
Figure 5:
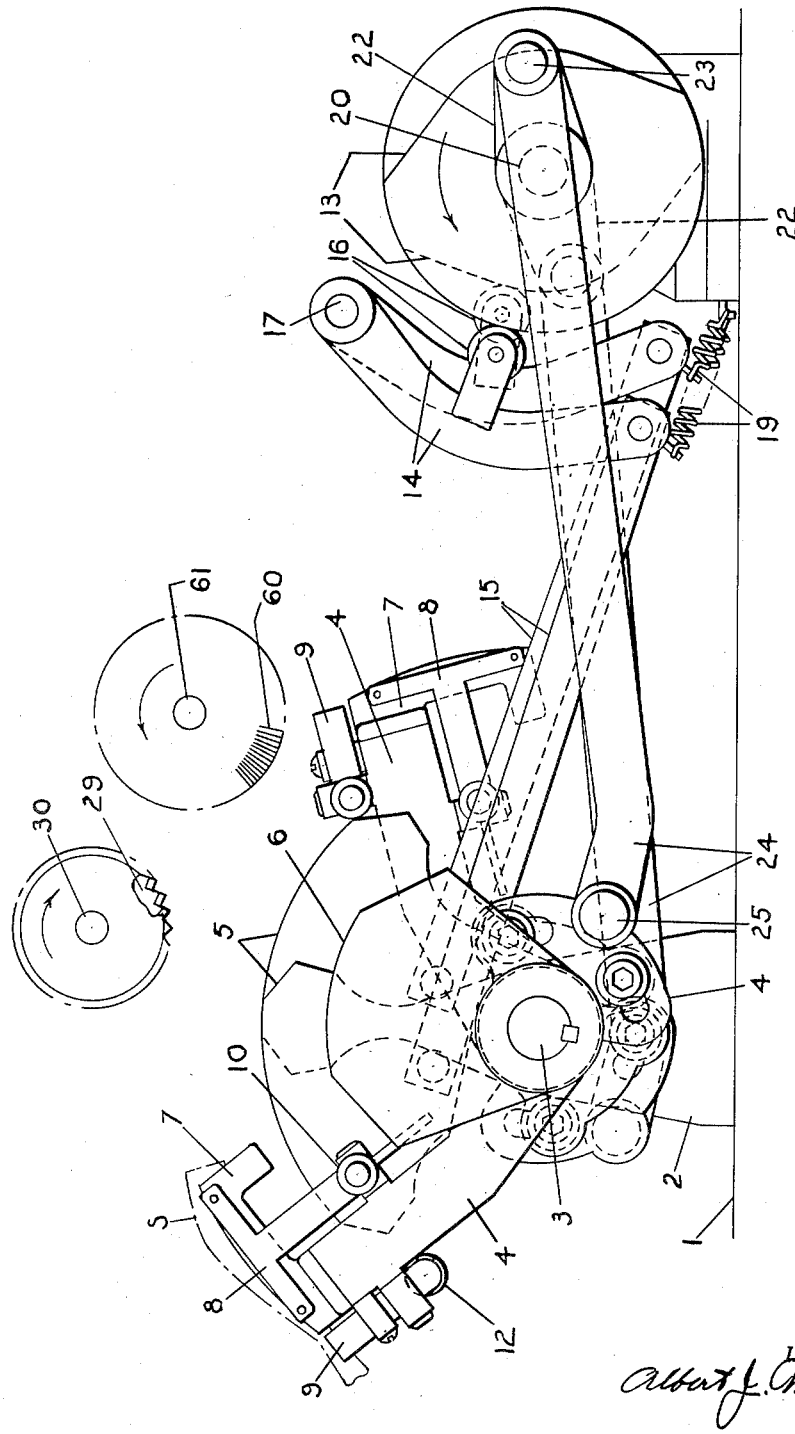
Fig. 5 illustrates the holders and operating mechanism with cutter and brush in relative positions.

Referring to Fig. 1 a machine frame is indicated at 1 and is provided at 2 with two bearings supporting a stationary cross shaft 3 on which are mounted two oscillating holder arms 4, two oscillating tail-gripper cams 5 and four stationary body-gripper cams 6. These are more clearly shown in Fig. 5 wherein the holder arms 4 are shown provided at their outer ends with shrimp holders 7, pivotally mounted body grippers 8 and tail grippers 9.

Figure 13:
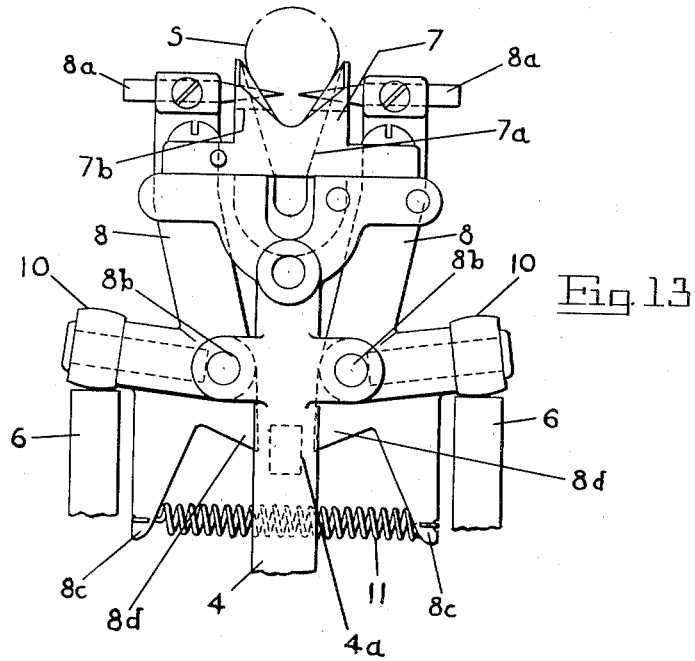
Fig. 13 shows a full size front elevation of one holder, and body gripper mechanism, upper section.
Figure 14:
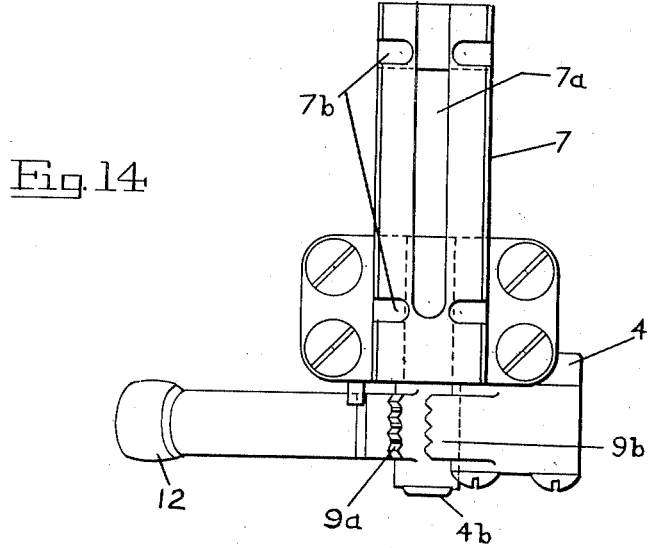
Fig. 14 illustrates in full size plan view the body holder and tail gripper.

Shrimp holder 7 as shown in Figs. 13 and 14 is a longitudinal V-shaped trough with a slot at 7a for reception of the shrimp legs. The trough is curved and formed to conform to the shape of the average shrimp as indicated at S in Fig. 5. Grooves 7b are provided in the holder 7 to provide operating space for the gripper pins which are shown at 8a mounted in the T-shaped body grippers 8 which are pivotally mounted on the holder arm 4 at 8b and provided with cam rollers 10 which cooperate with stationary cams 6 so as to close the body grippers during certain portions of the holder-arm oscillation. Body grippers 8 are provided with extensions 8c on which are mounted springs 11 urging rollers 10 into contact with cams 6. As these rollers run off the cams 6 at the loading and removing positions of the oscillating holder arm a limit stop 4a is provided on holder arm 4 and body grippers 8 are provided with projections 8d for engagement with said limit stop 4a.

Figure 12:
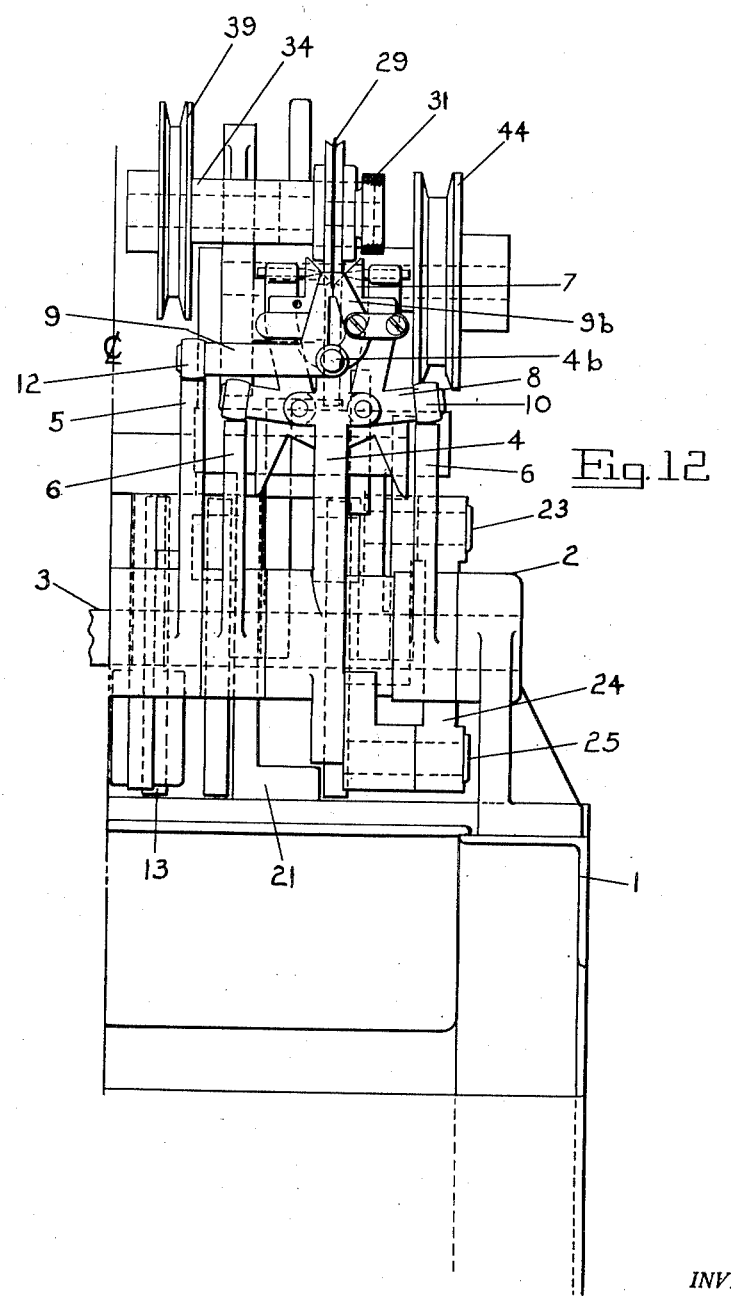
Fig. 12 is a front elevation of the right half of the machine which is a duplicate of the left half in reverse.

Tail grippers 9 shown in Figs. 12 and 14 are L-shaped and provided with gripping jaws 9a at one end and cam rollers 12 at the other end and pivotally mounted on holder arms 4 at 4b and arranged to cooperate with stationary jaws 9b attached to holder arms 4. Tail grippers 9 are normally opened in the loading position shown in Fig. 5, either by gravity or by means of springs (not shown) and are closed when rollers 12 engage oscillating cams 5 which are actuated by cams 13 through levers 14 and connecting rods 15. Levers 14 are provided with cam rollers 16 and pivotally mounted at 17 on bracket 18 and held against cams 13 by springs 19.

Cams 13 are mounted on cam shaft 20 which rotates continuously in bearings 21 mounted on frame 1.

Cam shaft 20 also carries cranks 22 at each end which are provided with crank pins 23 carrying connecting rods 24 which are pivotally attached by pins 25 to holder arms 4 for the purpose of oscillating the holder arms. The two cranks are shown opposed to provide alternating holder arm movements.

Figure 2:
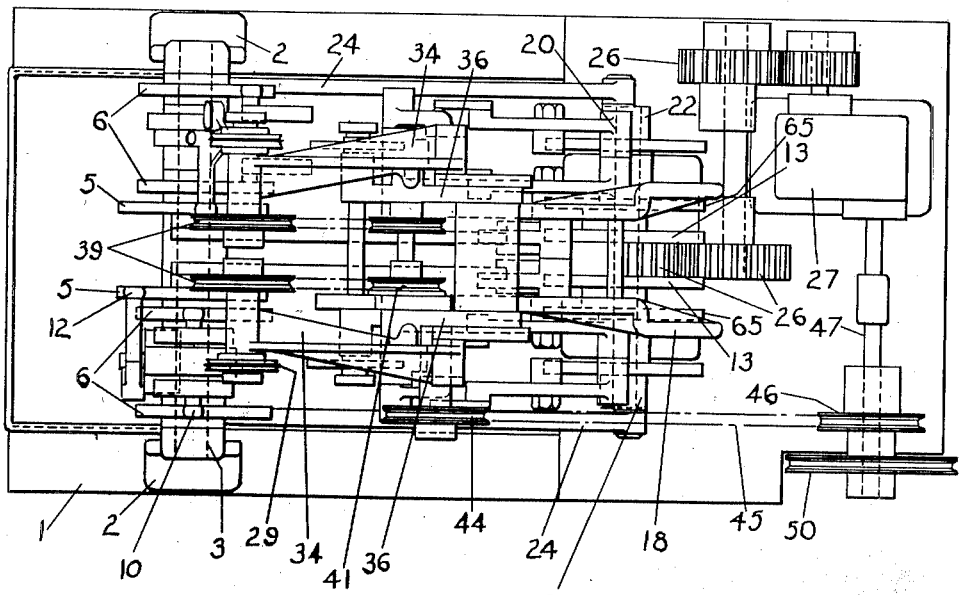
Fig. 2 is a top plan view.

As shown in Figs 1 and 2 the cam and crank shaft 20 is driven by gears 26 through gear reducer 27 and motor 28.

Figure 3:
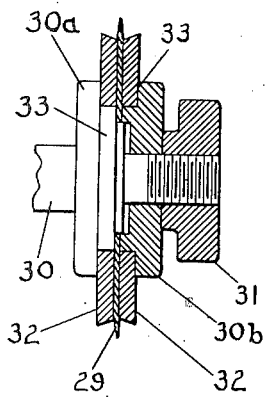
Fig. 3 is an elevation of part of the cutter shaft with assembled parts shown in cross section.
Figure 4:
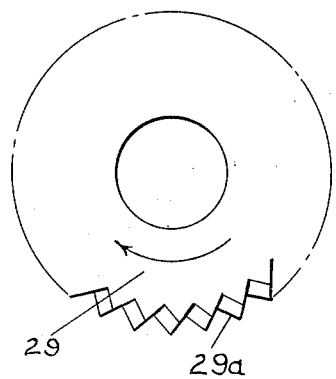
Fig. 4 shows a portion of the cutter in full size detail.
Figure 7:
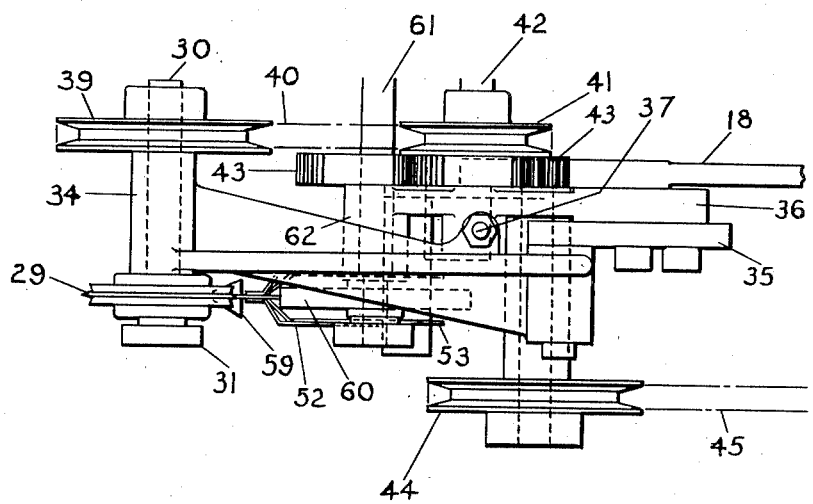
Fig. 7 is a plan view of slitting, deveining and shell spreading mechanism.
Figure 8:
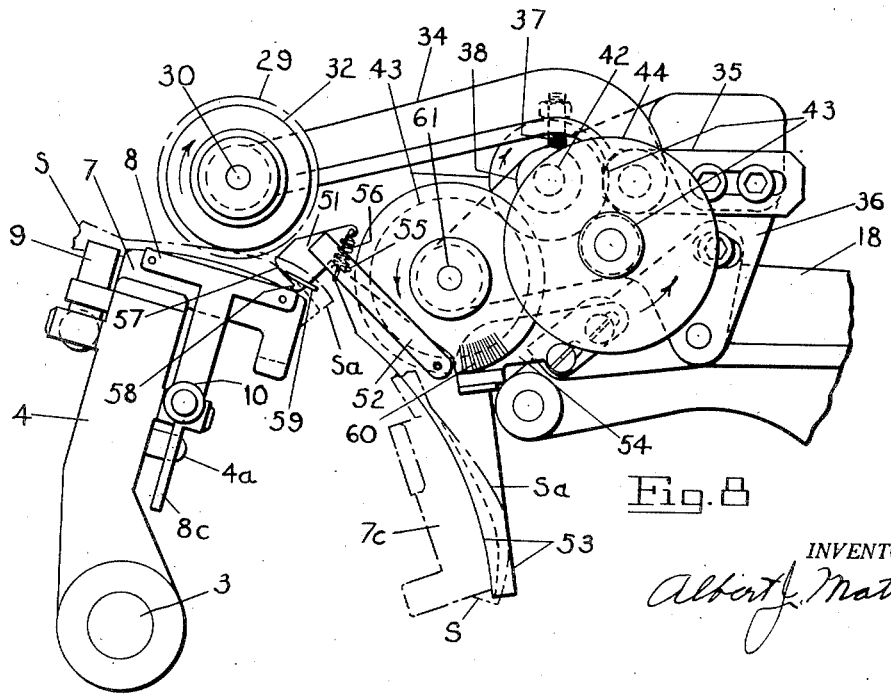
Fig. 8 is an elevation of the parts shown in Fig. 7 and includes one holder in slitting and deveining position and another in construction lines shows it in removing position with shell spread open.

After loading, and gripping the shrimp, the holder moves inward and passes under rotating slitting cutters 29 shown in detail in Figs. 3 and 4 and clamped rigidly on shafts 30 by means of nuts 31 and clamp washer 32. To limit the cutting depth discs 32 are rotatably mounted on each side of the cutters in annular recesses 33 provided by the shaft heads 30a and clamp washer 30b. As shown in Figs. 7 and 8, shaft 30 is rotatably mounted in arm 34 which is pivotally carried by bracket 35 adjustably mounted on an adjustable bracket 36 attached to main bracket 18. Downward movement of cutter arm 34 is limited by a set screw 37 against hub 38 on bracket 36. Upward movement of the cutter is provided so that it may follow the contour of the shrimp back. Sheaves 39 mounted on shafts 30 are connected by V-belts indicated at 40 to sheaves 41 mounted on shaft 42 which in turn is driven through gears train 43 and sheave 44 which is driven by belt 45 from sheave 46 on main drive shaft 47. The main drive shaft 47 is driven by motor 28 through belt 48 and sheaves 49 and 50.

Slitting cutter 29 does not have a sawing action but is designed to shear a cut into the shell and then tear the shell apart. For this purpose the teeth are beveled to a sharp forward edge 29a as shown in Fig. 4. This preserves the sharp edges and increases the cutter life.

The next inward movement of holder 4 brings the forward end of the shrimp to the spreading and deveining plow shown in Figs. 1, 7 and 8. The plow 51 is provided with two sidearms 52 pivotally mounted on arcuate blade like spreader bars 53 which are carried by bracket 54 attached to main bracket 18. Downward movement of the plow is limited by a pin 55 and is urged downwardly by spring 56 attached to the plow and the spreader bars.

At the bottom of the blade-like plow it is curved upwardly at 57 to engage the back of the shrimp body just above the sand vein and within the slit produced by the slitting cutter. The rear end of this curved portion terminates in a downwardly projecting deveining plow point 58 which plows into and scrapes the vein from the shrimp body. Just above point 58 is provided a triangular shell spreader 59 attached to plow 51 and adapted to spread the shell halves as at Sa so that further rearward movement of the holder 4 will cause the shell halves to move along the outside of spreader blades 53 and thereby hold the shell open until it reaches the body remover. At 60 is shown a rotating brush adapted to remove any remaining vein as the shrimp passes under it. Water may be supplied to this if desired. The brushes, one for each unit, are mounted on a shaft 61 carried in bearings 62 of brackets 36 and driven by the gear train 43.

During this portion of the holder movement from its vertical position to its down and inward position indicated by construction lines at 70 in Fig. 8 the tail gripper and body grippers remain closed but the body grippers open immediately after when reaching the position shown in Fig. 10. This is the unloading or body-removing position.

Figure 6:
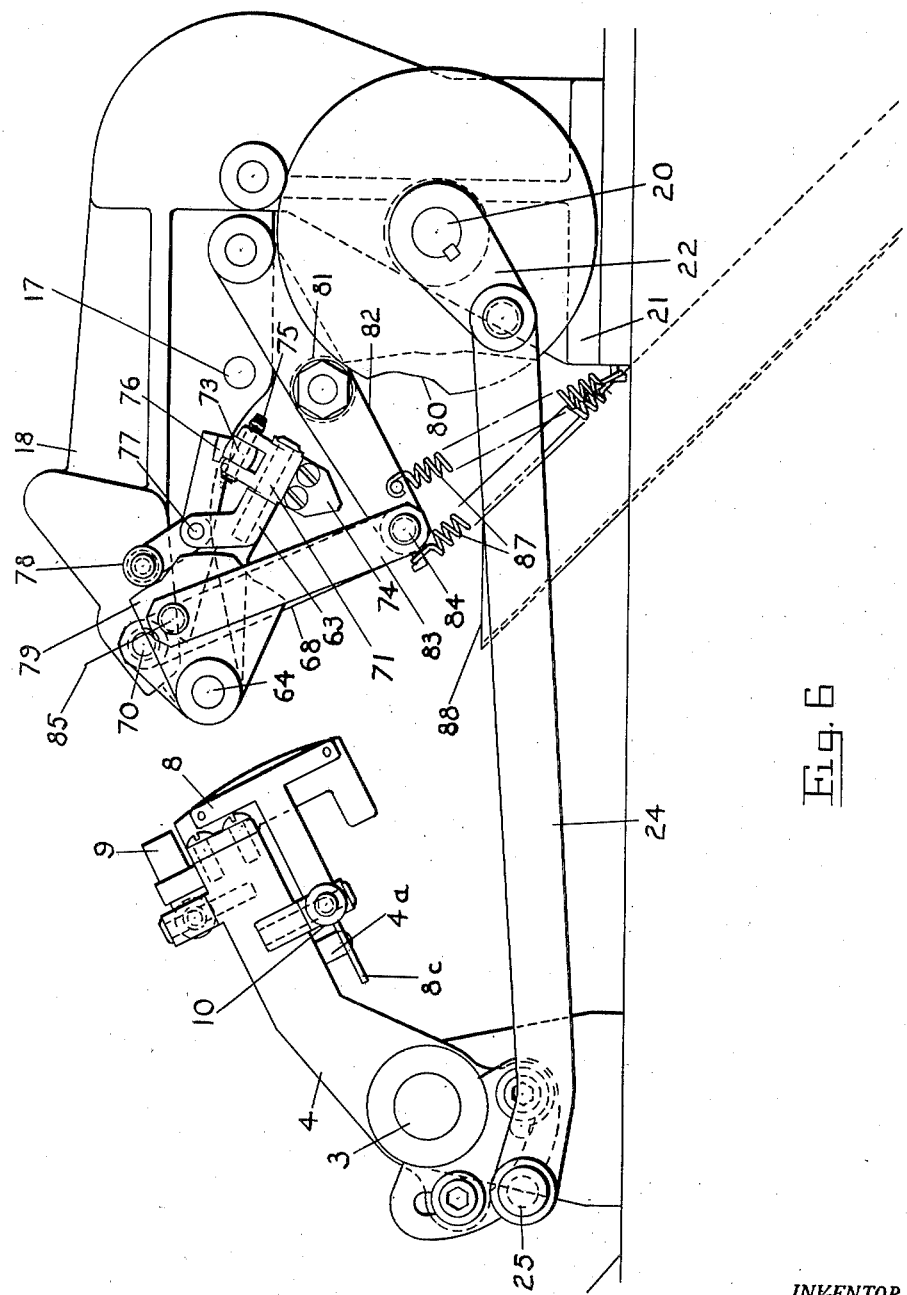
Fig. 6 shows one holder and remover in elevation with their relative operating mechanism.

Remover arms 63 are pivotally mounted on shaft 64 carried in the ends of brackets 18 and are swung from the position shown in Fig. 10 to that shown in Fig. 6 by means of cams 65 mounted on shaft 20 which operate levers 66 having cam rollers 67. Connecting rods 68 are pivotally connected with lever 66 at 69 and remover arm 63 at 70. At the outer end of remover arms 63 gripping levers 71 are pivotally mounted in pairs at 72 and provided with roller 73 and gripping plates 74 as shown in Figs. 10 and 11. These are normally held open by springs 75 and are closed by wedge-shaped ends of levers 76 pivotally mounted on remover arms 63 at 77 and provided with cam rollers 78 adapted to engage oscillating cams 79 which are pivotally mounted on shaft 64 and operated by cams 80 which engage roller 81 carried by levers 82. Connecting rods 83 are pivotally attached to lever 82 at 84 and to cam 79 at 85. Springs 86 hold cam rollers 78 against cams 79. Springs 87 hold lever rollers 67 and 81 against their respective cams 65 and 80.

In operation, when holders reach the position shown in Fig. 10 remover 63 is operated so that the open grippers 74 move into shrimp body encompassing position and then close and grip the body. The remover now swings rearwardly, tearing the body from the tail and when the remover reaches the position shown in Fig. 6 the body is released and drops into a chute shown at 88.

As the remover swings rearwardly the holder arm 4 raises and the tail grippers 9 release the tail which, along with the shell, is now free to drop into a central chute 89. Any shell parts clinging to the holder 7 are removed by brush 60 or may be removed by a stream of air or water.

After the holders return to approximately vertical position the tail grippers and body grippers open for reloading.

The machine comprises two alternately operating units side by side wherein one unit is in the forward loading position while the other unit is in the body removing position. Crank operation of the holder arms tends to slow down their oscillating speed at the crank dead centers thereby providing just enough time for loading so that an operator is kept busy loading the two units without waste of operator time. This also permits time for the removers to grip and remove the bodies.

Although the machine has been described for processing shrimp it may also be used for other types of shell fish or similar products. Various details of operating mechanism may be altered without departing from the spirit of the invention.

Having described my invention, what I claim as new and desire to secure by Letters Patent is:

1. In a machine for peeling and deveining shrimp, two like, complete units arranged side by side with corresponding ends facing the same way; each unit including an oscillatory member pivotally supported at its lower end for swinging movements in a vertical plane, a single shrimp holder on such member forming the sole support for a shrimp and being in position for loading at one limit of the oscillatory movements of said member and in delivery position at the other limit of such movements; the planes in which said members move being so near each other that an operator is enabled to load both holders without change of his position; and means to oscillate said members continuously in such out of step relation to each other that only one holder at a time is in the loading position.

2. In a machine for peeling and deveining shrimp, an oscillatory member pivotally supported at one end for swinging movements, a trough-like shrimp holder on the other end of the said member, a tail gripper at one end of the holder, main shrimp gripping means on said member beside the holder, means to oscillate said member to shift the holder back and forth between a loading position and a delivery position, a stationary cam beside said member for engagement with a part on said main gripping means to open the same at each limit of movement of said member, a cam beside said member and movable back and forth between two positions corresponding to the two aforesaid positions, respectively, of the holder, said movable cam being so placed as to engage a part on the tail gripper and cause it to open in each of said two positions of the movable cam, and means to operate said movable cam in such time relation to the movements of the holder that the tail gripper opens after the opening of the main gripping means when the holder moves into the delivery position.

3. In a machine for peeling and deveining shrimp, a member pivotally mounted at its lower end for swinging movements in a vertical plane, a power means to oscillate said member continuously through a predetermined angle, a holder for individual shrimps mounted on the upper end of said member, devices on said member for securing a shrimp in said holder, and means to move said devices into release position at each end of each movement of said member.

4. A machine as set forth in claim 3, wherein at least some of the devices for securing the shrimp in the holder are pins that enter the holder from the side.

5. A machine as set forth in claim 4, wherein one of the shrimp securing devices is a clamp for gripping the tail of the shrimp.

6. In a machine for peeling and deveining shrimp, a member pivotally mounted at its lower end for swinging movements in a vertical plane, power means to oscillate said member continuously through a predetermined angle, a trough-shaped holder for an individual shrimp mounted on the upper end of said member, shrimp-gripping elements mounted on said member in positions for gripping a shrimp in said holder, spring means to hold said elements in idle positions, and stationary cam means beside said member in position to engage said elements and hold them in shrimp-gripping positions while the holder is moving between points a short distance from the ends of the path of travel of the holder.

References Cited in the file of this patent
UNITED STATES PATENTS

| | | |
|---|---|---|
| 2,263,697 | Grayson | Nov. 25, 1941 |
| 2,299,774 | Weems | Oct. 27, 1942 |
| 2,301,729 | Krull | Nov. 10, 1942 |
| 2,515,101 | Swinden | July 11, 1950 |
| 2,625,705 | Avetta et al. | Jan. 20, 1953 |
| 2,665,449 | Schneider et al. | Jan. 12, 1954 |